Figure 3:
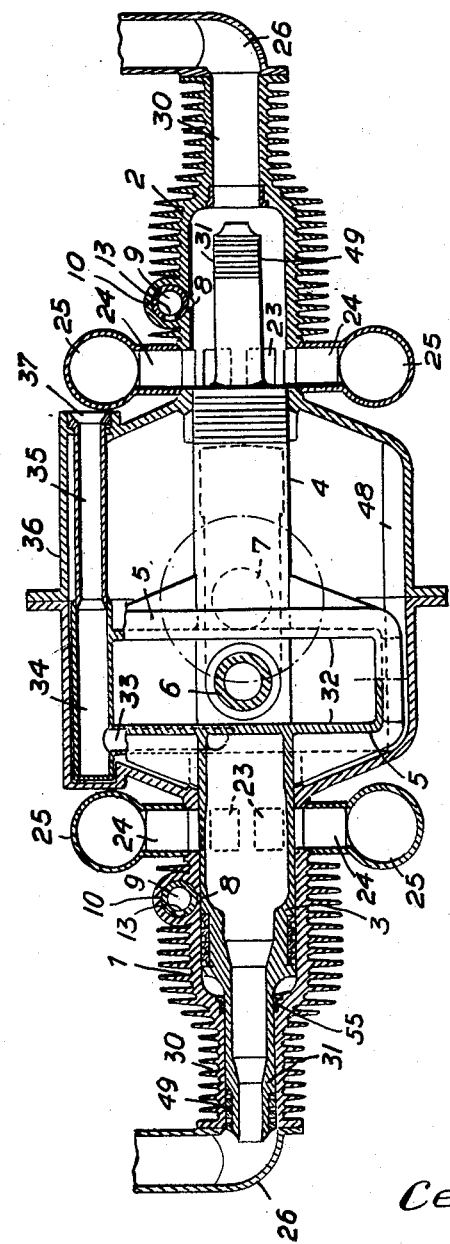

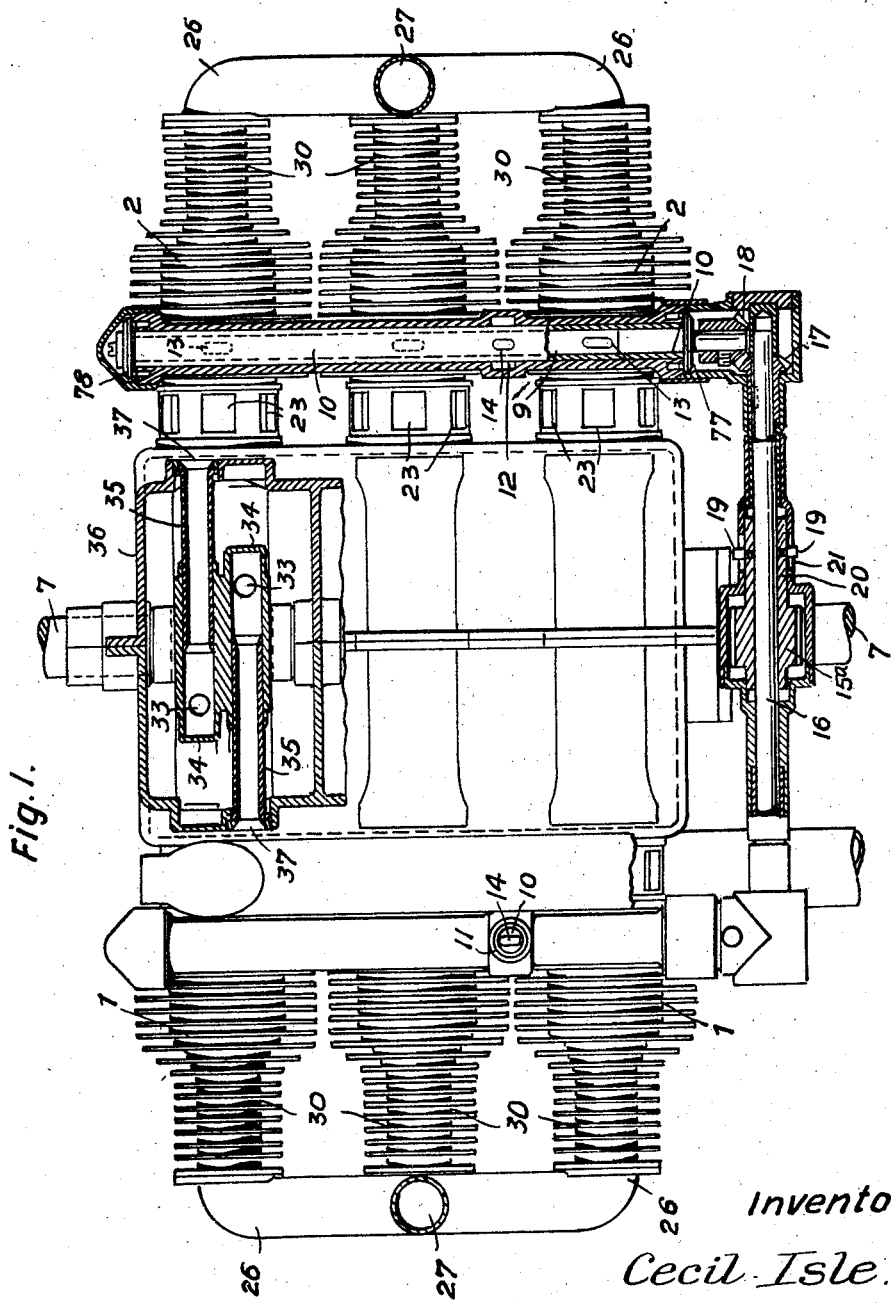

March 21, 1933.  C. ISLE  1,902,781
INTERNAL COMBUSTION ENGINE
Filed May 18, 1929   7 Sheets-Sheet 2
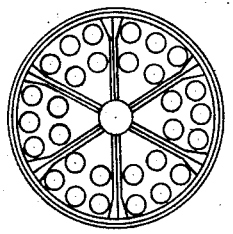
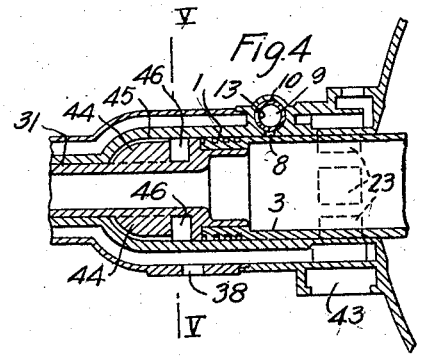
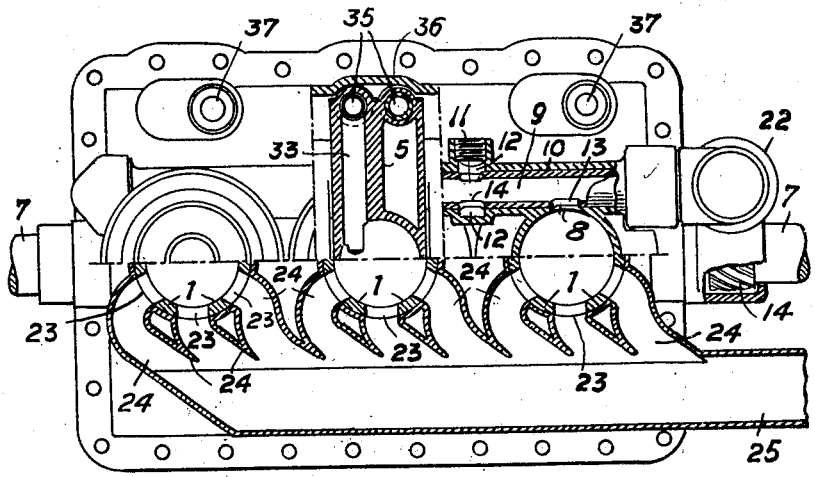
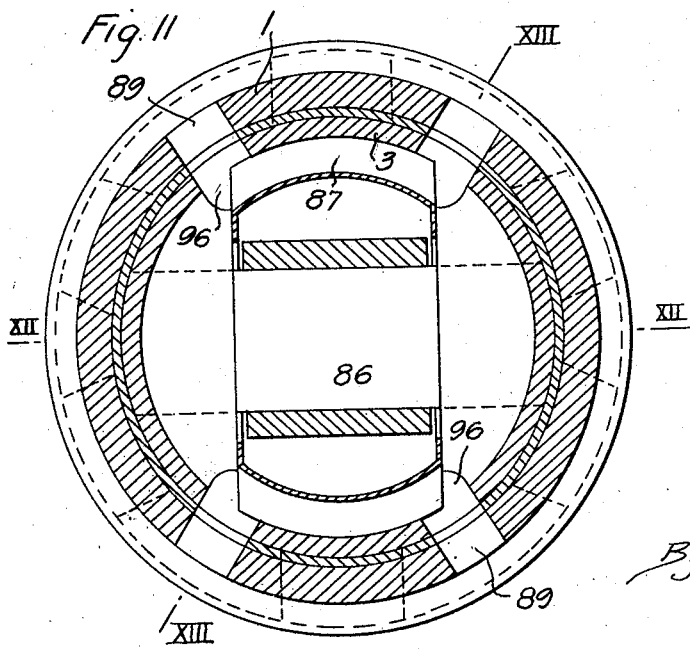
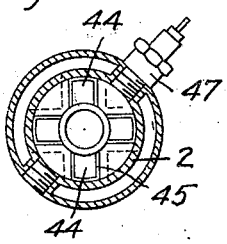
Inventor:
Cecil Isle
By William C. Linton.
Attorney.

March 21, 1933.   C. ISLE   1,902,781
INTERNAL COMBUSTION ENGINE
Filed May 18, 1929   7 Sheets-Sheet 3

Inventor:
Cecil Isle.
By William C. Linton
Attorney.

March 21, 1933.  C. ISLE  1,902,781
INTERNAL COMBUSTION ENGINE
Filed May 18, 1929  7 Sheets-Sheet 4
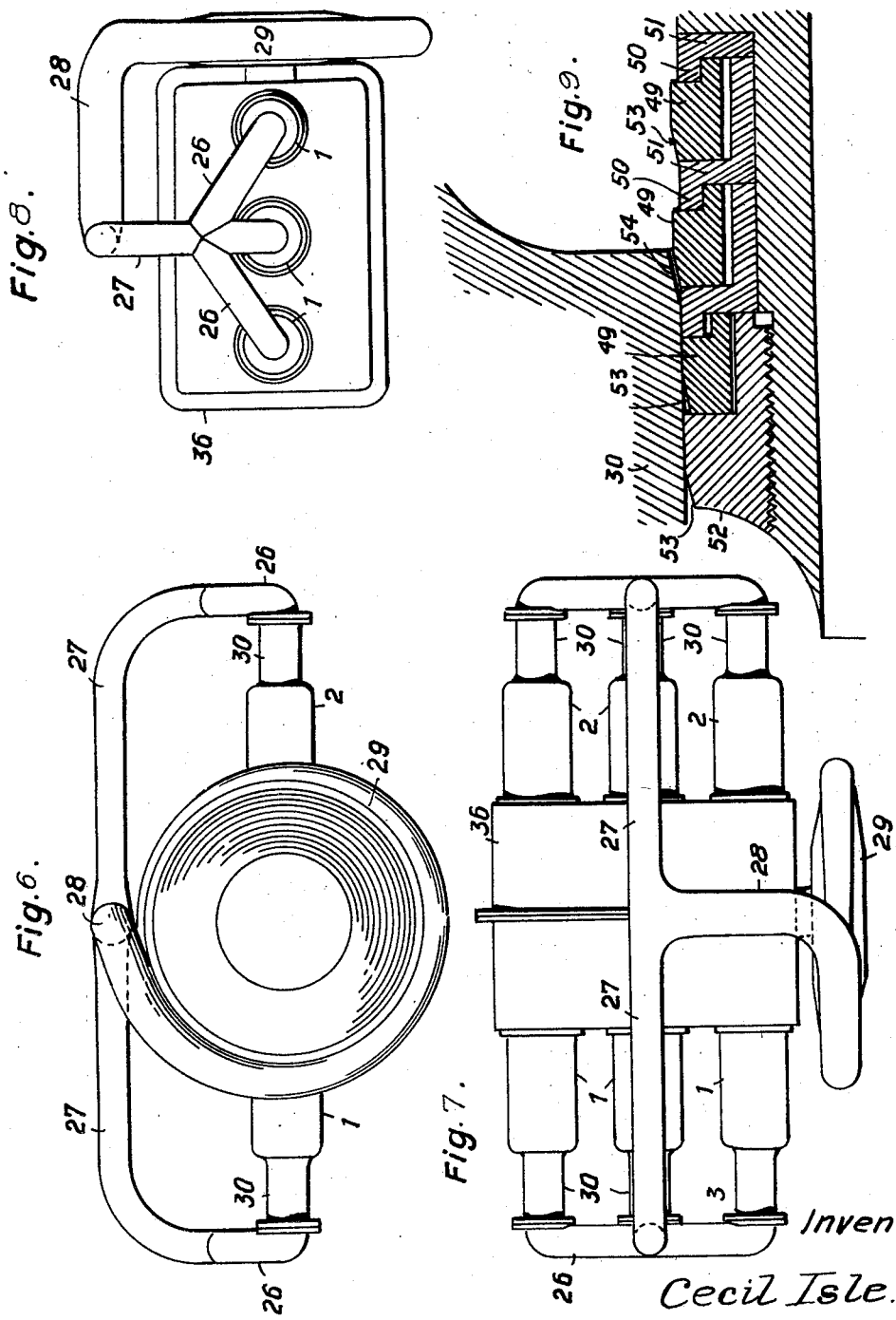
Inventor:
Cecil Isle.
By William C. Linton
Attorney.

March 21, 1933.  C. ISLE  1,902,781
INTERNAL COMBUSTION ENGINE
Filed May 18, 1929   7 Sheets-Sheet 5

Inventor:
Cecil Isle
By William C. Linton
Attorney.

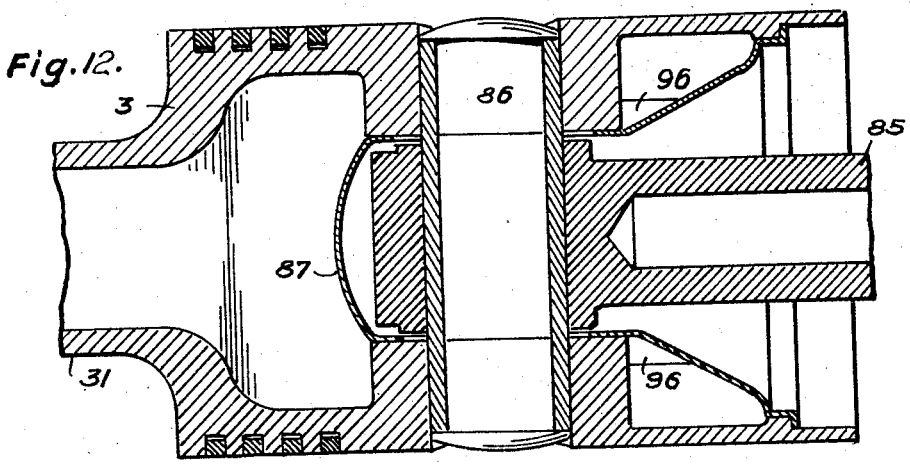
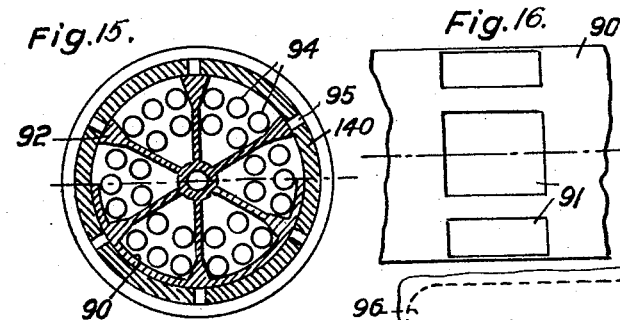
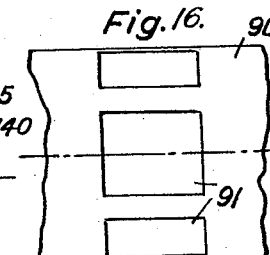
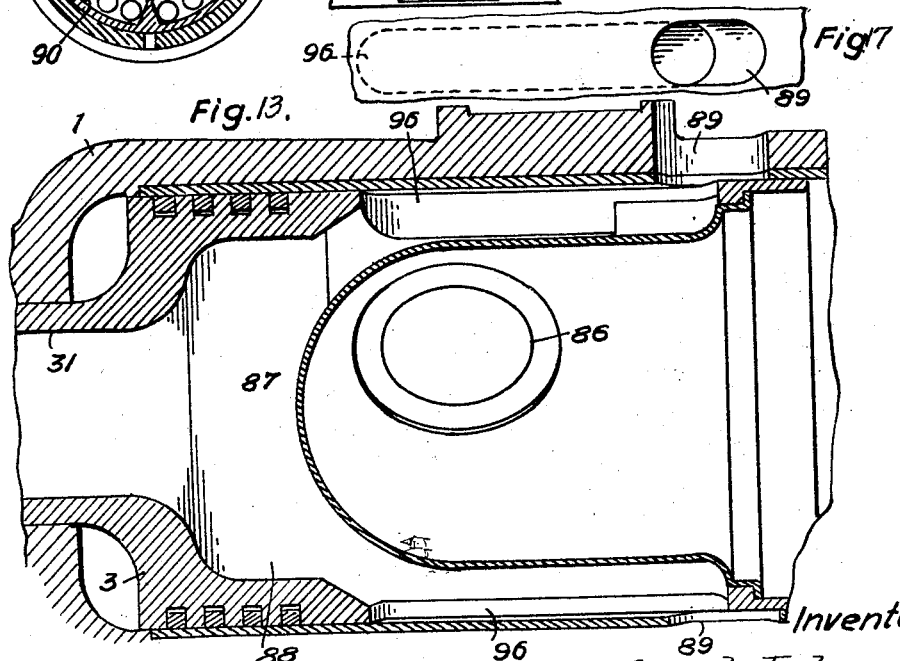

March 21, 1933.　　　C. ISLE　　　1,902,781
INTERNAL COMBUSTION ENGINE
Filed May 18, 1929　　7 Sheets-Sheet 7

Inventor:
Cecil Isle.

By William C. Linton
Attorney.

Patented Mar. 21, 1933

1,902,781

UNITED STATES PATENT OFFICE

CECIL ISLE, OF LONDON, ENGLAND

INTERNAL COMBUSTION ENGINE

Application filed May 18, 1929, Serial No. 364,241, and in Germany May 18, 1928.

The present invention relates to internal combustion engines and has for its object to provide a two-stroke cycle internal combustion engine wherein the piston has a tubular extension adapted to slide in an extension of the cylinder and to control the supply of air to the cylinder at one end of the latter while the piston controls exhaust ports at the opposite end.

The invention further aims to provide a hollow working piston for internal combustion engines of the character mentioned, said piston having a tubular extension adapted to control the supply of air in such a manner to be traversed by cooling air which enters at one end independently from the air entering into the cylinder, the air entering into the cylinder and the air entering into the hollow working piston passing through the cylinder and piston in two parallel streams.

The tubular extension of the piston preferably passes out of the cylinder extension, so that the air is admitted over the whole area of the tubular extensions during the exhaust period.

The cylinder may have air supply passages adjacent the tubular extension of the cylinder preferably adapted to receive corresponding ribs on the piston at the end of the compression period.

The piston and its tubular extension are adapted to form a passage for the cooling air which is, without entering the crank chamber, discharged directly into the atmosphere, so that lubricating oil in the crank chamber cannot enter the hollow inside space of the piston and its extension. Instead of air, other well known mediums can be used. The air entering the tubular extension of the piston independently of that entering the cylinder, is preferably cut off during the exhaust period, so that practically all the air then enters the cylinder space.

The air for cooling, scavenging and combustion, may enter directly out of the tubular extension of the cylinder into the cylinder during the period of exhaust.

Figure 10:
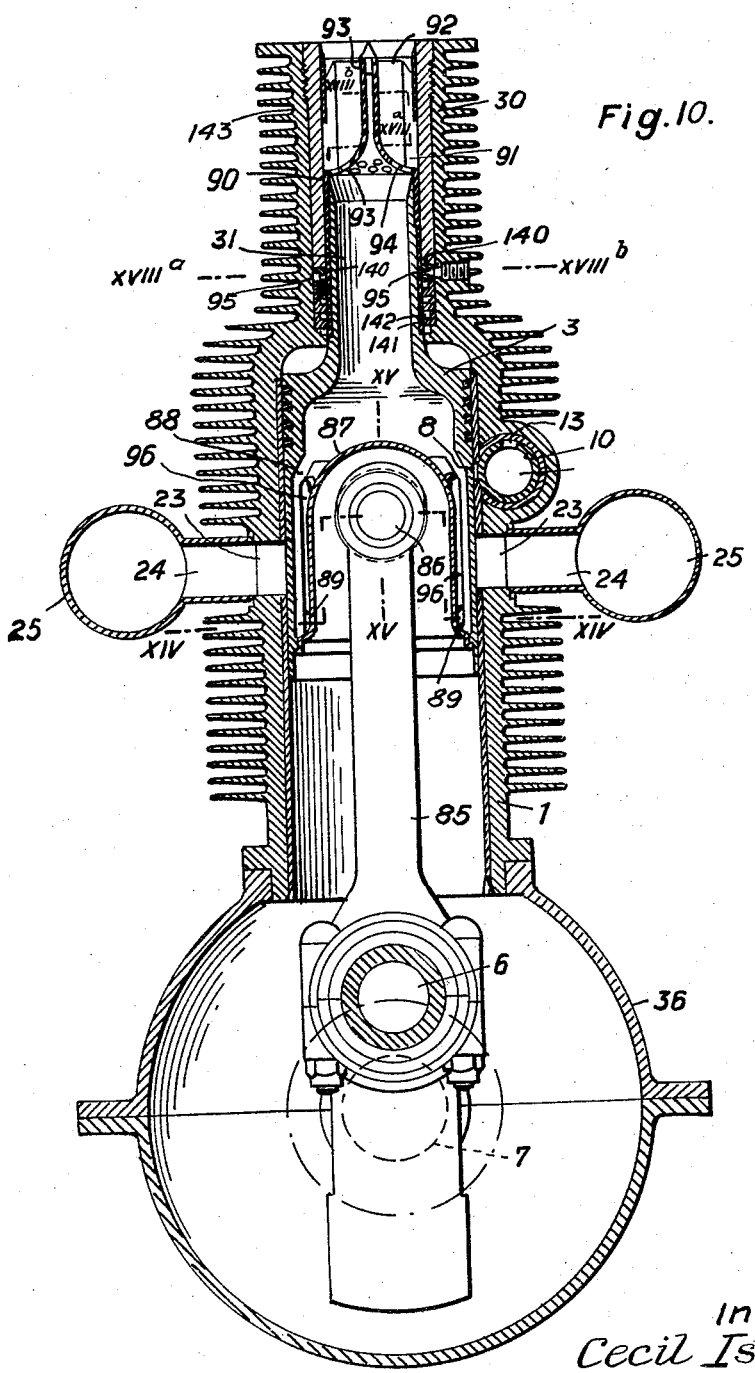
Figure 18:
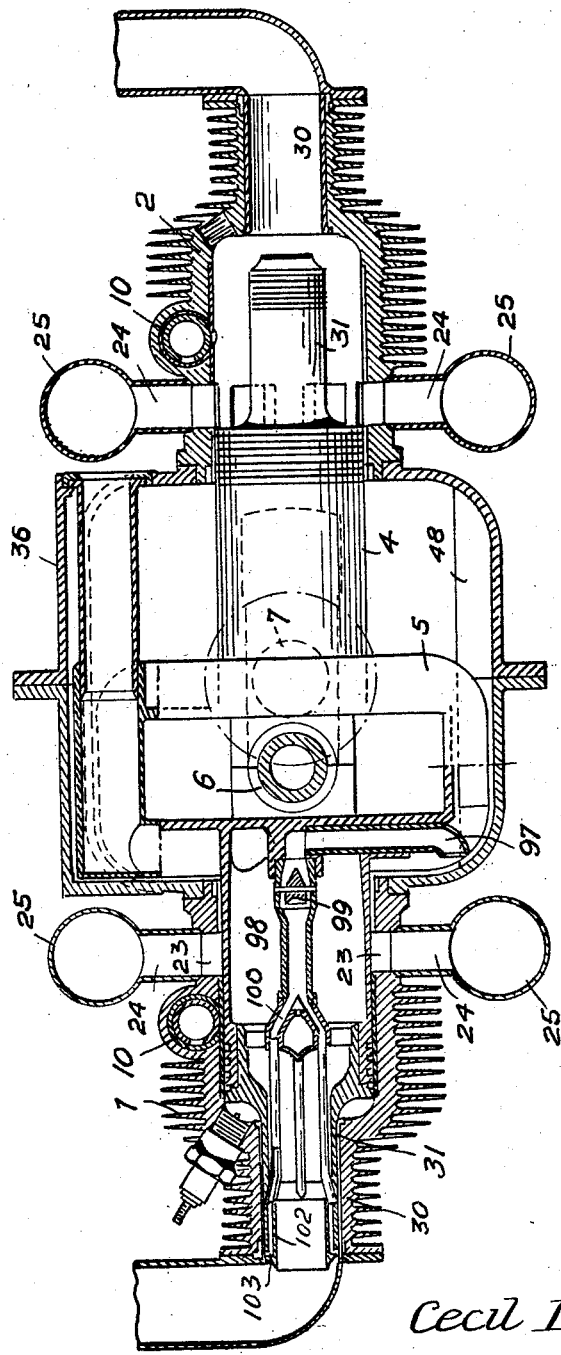

Several embodiments of the invention are illustrated by the accompanying drawings, in which:

Figure 1 shows a six-cylinder internal combustion engine with two opposite cylinders in plan and partly in section, Figure 2 is an end-elevation of the internal combustion engine partly in section, Figure 3 is a longitudinal section through one pair of cylinders, partly in section, Figure 4 illustrates a modification in longitudinal section of one cylinder and its piston, Figure 5 is a cross-section through one cylinder with piston on the line V—V of Fig. 4, Figures 6 to 8 show the internal combustion engine diagrammatically in outside view, plan and end-elevation, Figure 9 shows a piston-ring-arrangement in longitudinal section, Figure 10 is a longitudinal section through another modified construction of the internal combustion engine, Figure 11 is a cross-section on the line XIV—XIV of Fig. 10, Figure 12 is a longitudinal section on the line XV—XV of Figs. 10 and 11, Figure 13 is a longitudinal section on the line XVI—XVI of Fig. 11, Figure 14 is an end-view of the piston-extension, Figure 15 a cross-section through the piston-extension, whereby the upper half towards the line XVIIIa—XVIIIa and the lower half towards the line XVIIIb—XVIIIb Fig. 10 are shown in section, Figure 16 shows the air-escape-openings in the piston-extension in plan, Figure 17 is a detail of the air transit-passage in the piston and the air-escape opening in the cylinder in plan, Figure 18 illustrates a modified form of the construction shown in Fig. 3, with lubricating-arrangement, In the constructions, illustrated in Figs. 1–3 of the drawings, the internal combustion engine is provided with three oppositely disposed pairs of cylinders 1, 2 having their working-pistons 3, 4 connected with a slot-and crank-drive 5, each of which acts upon one of the opposite cylinders the other by a 120° staggered crank 6.

Fuel-gas is admitted to the cylinder by one or more openings 8 in the cylinder-wall, located at a point about 1/3 of the compression-stroke of the piston. The gas is supplied by a passage 9 of the rotary slide-valve 10 extending on each side of the engine over all three cylinders 1 and 2 and charged by a supply-socket 11 and annular canal 12, (Fig. 2). The gas-supply cylinder is controlled by the rotary slide-valve 10, provided with gas escape-openings 13 and two gas inlet-openings 14. The fuel-gas distributes itself towards both sides of the passage 9, and enters the cylinders 1 and 2 as soon, as the gas escape-openings 13 stand opposite the gas inlet-openings 8 in the cylinder-wall and the working-pistons 3 and 4 have bared the gas inlet-openings 8 in the cylinder-wall. The rotary slide-valve 10 is controlled from the crank-shaft 7 by means of a worm-wheel 15, mounted upon the same, (Fig. 2) engaging with a worm-wheel 15a (Fig. 1), mounted upon a shaft 16 disposed vertically of the crank-shaft and displaceable axially of the latter. The ends of the axially displaceable shaft 16 are connected with each bevel gear 17 by means of grooves and keys received therein.

The bevel-gear 17 engages another bevel-gear 18, whereby the rotary slide-valve is driven. The ratio of transmission between rotary slide-valve 10 and crank-shaft 7, is 1:1 and the gas escape-openings 13 of the rotary slide-valve 12 are, just like the cranks 6, staggered by 120°. The ratio of transmission may be as desired, whereby the number of gas escape-openings per cylinder stands in opposite ratio thereto. In order to adjust the rotary slide-valve 10 including gas escape-openings 13 and vary the gas-admission thereby, the cam-shaft 16 is displaced axially, whereby, consequent to the rotation of the worm-wheel 15a, firmly mounted upon the same, a rotation of the shaft 16, is effected relative to the worm-wheel 15, mounted upon the crank-shaft 7, and therefore also the rotary slide-valve 10. Displacement of the cam-shaft 16 may be effected by lever, (not shown) acting upon pins 19. The pins 19 are fitted on a sleeve 20, loosely mounted upon the cam-shaft 16 and displaceable in a slot 21 of the casing 22, surrounding the cam-shaft 16 with worm-wheel 15a (Fig. 1). A separate means for adjusting the rotary slide-valve is therefore not employed, but adjustment of the rotary slide-valve is simply obtained by the axial displacement of one of the employed worm-wheels. The direction of rotation of the engine is furthermore controlled by the same means, i. e. by rotation of the rotary slide-valve from its respective position by 180°.

Regulation of the engine from zero to maximum, is effected by adjustment of the slide in the direction of rotation. In order to avoid, under eventual leak of the rotary slide-valve 10, the escape of gases at the packing-surface into the open air, the slide is, at its ends, provided with flanges 77, 78, the flange 77 being fixed and the flange 78 movable with the adjustable rotary slide-valve 10 (Fig. 1).

Gas-admission through the cylinder-wall openings 8 into the cylinders 1, and 2 controlled by means of the rotary slide-valve 10, is further controlled by the working-pistons 3, and 4. The escape of the burned gases from the cylinders is effected by slots 23 with adjacent passages 24 distributed over the circumference of the cylinder and of which the one half enters a lower and the other half an upper gas exhaust-pipe 25, (Figs. 2 and 3).

The passages 24 are formed scooplike so, that the gases enter the exhaust-pipes 25 directly under a minimum of resistance, and may be combined into a common exhaust-pipe.

The combustion-, and scavenging-, and cooling-air is preferably admitted into the cylinders under slight pressure by pipes 26, connected with the end of each cylinder. The air-supply-pipes are, as shown in Figs. 6–8, connected by receiving-pipes 27, 28 with a ventilator 29, preferably a single-stage, high-pressure fan, mounted upon the engine-shaft 7, by means of which the air, controlled by a throttle-valve or the like, is admitted to the different cylinders. At the ends of the cylinders, pipe-sockets 30 are provided, in which piston-valves 31, attached to the working-pistons, slide. The pairs of diametrically opposed working-pistons 3, 4 are with their piston-valves 31, in Figs. 1–3 formed with a slot and crank drive 5, the working-surface of which consists of sheet-steel or the like.

For guiding the slotted crank drive 5 against torsion, longitudinal ribs 48 are provided on the inside of the crank-casing 36, (Fig. 3). The piston-valves 31, sliding in the pipe-socket 30, effect admission of the combustion-, scavenging- and cooling-air into the cylinders.

The air, supplied by the fan 29, serves for internal cooling of the hollow working-pistons 3, 4 while passing therein through the open end of the piston-slides 31, guided part of their way by the cylinder-extension 30, (Fig. 3). The air admitted at 26, flows through the interior of the slide 31 and pistons 3, 4 and enters the passages 33 and pipe-passage 34 in the slotted crank-drive 5. The pipe-passages are over each passage in the crank-casing 36 fitted with telescopingly displaceable pipes 35, through which the cooling-air escapes into the open air at 37. The air discharge-passage is thereby separated perfectly from the oil in the crank-casing 36. During the exhaust-period, (Fig. 3, right hand) the air passes the pipe 26 and through the cylinder-extension 30 into the interior of the cylinders 1, and 2, washing and cooling the same perfectly by its strong air-current so, that all remaining gases, etc. are ejected from the cylinder and the cylinder charged with pure combustion-air. During the initial air-admission into the cylinders, the air-discharge from the interior of the pistons is cut-off so, that as far as possible, all air admitted at 26, passes through the cylinder.

The piston-valve 31 is in Figs. 4 and 5 provided with ribs 44, which in the end-position of the compression-period, engage with the air-supply-passages 45 with play. An annular combustion-chamber 46 is formed hereby. The explosion- and compression-pressure acts as well upon the piston-bottom, as consequent to the play of the ribs 44 in the passages 45, upon the ribs 44. By entering of the ribs 44 into the passages 45, the mixture is well whirled around. Ignition is effected in the usual manner by one or more spark-plugs 47 (Fig. 5).

The remaining construction of the embodiment according to Figs. 4 and 5 of the drawings is similar to the one illustrated in Figs. 1–3.

The piston-rings 49 of the piston-valves 31 are pushed-over endwise and prevented from slipping off by overlapping intermediate rings 51, provided with an annular extension 50, (Fig. 9). The piston-rings 49 are for this purpose correspondingly offset.

After all piston-rings have been put in place, they are retained in their position by a socket 52, screwed upon the piston endwise.

The piston-rings, and the socket 52, as well as the cylinder-bottom are for facilitating insertion of the rings into the pipe-extension 30, provided with a cone 53, 54. The point of entrance can, as shown in Fig. 3, be provided with a special steel sleeve 55, to allow for wear. This piston-ring construction is particularly important for Figs. 1–3, in which the other piston-rings are not applicable. For the purpose of facilitating assembling, as for instance dispensing with the usual tensioning-devices for inserting the piston-rings, the construction of the working-pistons 3, 4 is the same as the one of the piston-valves 31 with the difference, that the piston-rings are made without cone and in their entire length cylindrical. The intermediate rings 51 can, for reason of their expansion and wear, be made of steel, instead of light metal.

In the construction according to Figs. 10–17, the working-piston 3, movable in the cylinder 1, acts by means of connecting-rods 85, linked at 86 to the working-piston 3, upon the cranks 6 of the crank-shaft 7 in the crank-casing 36. The cylinders and working-pistons can here likewise be arranged on one or both sides of the crank-shaft. The working-piston, preferably made of light metal, is hollow and provided inside with a hood 87, made for instance of sheet-metal, or preferably stamped-out of light metal, whereby the interior of the piston is air-, and oil-tight packed towards the crank-casing 36.

By the hood 87, a chamber 88 is formed in the hollow working-piston, through which the cooling-air, entering at the end of the piston-extension flows, is discharged by slots 96 in the piston 3 and openings 89 in the cylinder 1, (Figs. 11 and 14).

A sleeve 90, preferably of steel, is mounted upon the piston-extension 31, provided with openings 91, through which the cooling-, scavenging- and combustion-air, admitted at the end of the sleeve 90, enters the cylinder during the exhaust-period, washing the latter out and charging it with fresh combustion-air.

The sleeve 90 is provided with a rib-extension 92, the radial ribs of which are tapered towards their ends in order to cut the air easily. The mechanical strength of the sleeve 90 is increased by the ribs 92, and centrally, at the ends likewise a pointed part 93, whereby a specially favourable air-conducting is obtained.

In the drawings, the rib-extension 93, 93 is made with the sleeve 90 in one piece. The bottom of the central part 93 is, by openings 94 sieve-like perforated, through which openings the cooling-air can enter the interior of the hollow piston. During passage of the air, through the openings 91 into the cylinder-chamber, the discharge of the air is preferably cut-off from the interior of the piston whereby the piston-slots 96 are rendered out of register with the air discharge-openings 89, so that all air passes, as far as possible, through the cylinder-chamber.

Long slots in the cylinder and short slots in the piston, or equally long slots in both parts may however be provided and the air may likewise permanently be discharged through the piston. The gasified fuel is, as in the constructions shown in Figs. 1–3 and 4–5, admitted to the cylinder-chamber by a passage 8, charged by a channel 9 of a rotary slide-valve 10, connected with gas escape-openings 13. The discharge of the exhaust-gases from the cylinder is effected by the openings 23 into exhaust-pipes 25, arranged parallel on both sides of the working-cylinder. Lubrication of the piston-extension 31 is effected by the openings 95 in the ring 140, which is, like the intermediate rings 141 for the inwardly resilient piston-rings 142 in the cylinder-pipe-socket 30 tensioned by the bushing 143, preferably made of electron. The lubricating-holes 95 are by the cylindrical surfaces of the ribs 92, covered in passing the air-openings 91 at the lubricating-holes 95 (Fig. 15).

In the construction according to Figs.

10–17, the crank-drive may be employed instead of the connecting-rod-drive. In the construction according to Fig. 18 of the drawings, which corresponds to Figs. 1–3 and provided with a drive for the cranks 6, and the crank-shaft 7, because of the arrangement of on both sides of the crank-casing 36 of cylinders 1, 2 and pistons 3, 4 and slotted crank-drive 5, guided by ribs 48 on the crank-casing, lubrication of the piston-valve 31 has been provided from the crank-chamber. For this purpose, pipe (97) connected with every working-piston, enters the crank-casing 36 and leads to a central pipe 98 in the working-piston.

In order, that the oil, scooped from the crank-casing by the pipe 97, may be as far as possible prevented from flowing back, a check 99 has been installed into the pipe 98, which permits the oil, to enter freely, but prevents its return flow by repulsion.

The oil is, by means of a distributor 100, conveyed from the pipe 98 into concentrically disposed pipes 101, whereby the lubricant is passed to channels 102 of the piston-valve 31, by way of which it is, through the openings 103 at the end of the piston-valve, passed to the sliding-surface.

In Figs. 10 and 18, the cylinders consist of light metal, and the working-cylinders and gas-slides 10 are bushed with steel or the like. In Fig. 18 the cylinder-extension is likewise bushed with steel or the like.

The fuel-gas, admitted to the cylinder, is preferably also supplied under pressure. Gasification may be effected under utilization of the heat of the exhaust-gases.

For proper mixing, the fuel-gas entering (Figs. 3 and 4) the cylinder at 8 with the air supplied by 26 and contained in the latter, the arrangement can so be made, that the gas enters the cylinder in tangential direction, whereby a whirling-about of the gas and the air is effected to effect a close mixture. Supplying the fuel-gas under pressure is however generally sufficient.

Instead of the rotary slide-valve for the gas-admission, a reciprocating piston-valve may also be provided, which may be operated by an eccentric or cam, mounted upon the engine-shaft in any well known manner.

In the described examples for embodying the present invention it has been presumed, that the cylinders are supplied with pure fuel in gasified or evaporated condition. A fuel-air mixture, or a mixture of different gases, also oxyhydrogen-gas etc. or liquid fuel, may be supplied, but preferably in atomized condition.

Instead of the single-stage ventilator, a multiple-stage turbo-ventilator, compressor, piston-pump, Root's blower, or the like may be employed, or air under pressure may be taken from a tank. Atomized water or steam can furthermore be supplied and burnt in the cylinder.

The cooling-air, flowing through the inner hollow space can, instead of being discharged into the open air, enter the crank-casing. The air-current can furthermore be continuous, instead of being interrupted during the exhaust-period.

Manifestly, the construction shown is capable of considerable modification, and such modification as is within the scope of my claims, I consider within the spirit of my invention.

I claim:

1. In an internal combustion engine comprising a cylinder having inlet and exhaust ports, a working piston moving in said cylinder, a tubular extension formed with said cylinder whereby air under pressure may be supplied within said cylinder, means carried by the piston for controlling the flow of air through said tubular extension, and said piston adapted to control the exhaust port within the cylinder, whereby the compressed air that enters the cylinder may be permitted to flow therethrough.

2. In an internal combustion engine comprising a cylinder having inlet and exhaust ports, a working piston movable in said cylinder and adapted to control the exhaust port thereof, a tubular extension formed with said cylinder whereby air under pressure may be supplied thereto, an extension formed with said piston and slidable within said tubular extension of the cylinder for controlling the flow of air under pressure through said tubular extension.

3. In an internal combustion engine comprising a cylinder having inlet and exhaust ports, a tubular extension formed with said cylinder, means for supplying air under pressure to said tubular extension of the cylinder, a hollow working piston moving in said cylinder and adapted to control the exhaust port thereof, and means carried by the piston for controlling the flow of air through said tubular extension whereby the air may at times flow in two separate and parallel streams through said cylinder and its piston.

4. In an internal combustion engine comprising a cylinder having an exhaust and inlet port, means for supplying air under pressure to said cylinder, a hollow working piston movable in said cylinder, and adapted to at times communicate with said air supplying means whereby the air may enter said piston, means carried by said piston for controlling the flow of air from said air supplying means to said cylinder, said piston adapted to control the exhaust port of the cylinder whereby the air under pressure may at times be permitted to pass through said cylinder, and means for controlling the flow of air through said hollow piston whereby during the exhaust of the air under pressure through said cylinder, the air under pressure will be prevented from passing through said piston.

5. In an internal combustion engine comprising a cylinder, means for admitting air under pressure to one end of said cylinder, said cylinder having exhaust ports arranged within the opposite end thereof, means for admitting an explosive mixture to said cylinder between said air inlet and exhaust port, a hollow piston workable within said cylinder, means carried by said piston for controlling the flow of air into the cylinder from air supplying means, and said piston having a passageway therein communicating with the atmosphere whereby air from said air inlet may be permitted to continuously flow through said piston.

6. In an internal combustion engine comprising a cylinder having inlet and exhaust ports, a piston working within said cylinder, a tubular extension formed with said cylinder, means for supplying air under pressure to said tubular extension, means for controlling the flow of air from said tubular extension into said cylinder, said piston having a passageway therein adapted to communicate with said tubular extension, and means for controlling the flow of air through the passageway formed within the piston.

7. In an internal combustion engine comprising a cylinder, having inlet and exhaust ports, a tubular extension formed with said cylinder, means for supplying air under pressure to said tubular extension, a hollow working piston movable in said cylinder adapted to communicate with said tubular extension whereby air may be continuously supplied within the hollow working piston, a crosshead for driving the crankshaft of the combustion engine, and said crosshead having slots formed therein for the escape of air flowing through said hollow piston.

8. In an internal combustion engine, a cylinder having inlet and exhaust ports, a tubular extension formed with said cylinder, means for supplying air under pressure to said tubular extension a hollow working piston moving in said cylinder, an extension formed with said piston and slidable within the tubular extension of the cylinder whereby the air under pressure admitted to the tubular extension of the cylinder may flow within the hollow working piston, a reciprocating crosshead for driving the crankshaft of the combustion engine and provided with an air outlet passage, and a crankshaft casing having air discharge means adapted to register with the air outlet passage of the crosshead during reciprocation thereof.

9. In an internal combustion engine, a cylinder provided with a tubular extension, a hollow working piston moving in said cylinder and having an extension guided in the tubular extension of the cylinder, means for supplying air under pressure to the tubular extension of the cylinder, a reciprocated crosshead for driving the crankshaft of the combustion engine and provided with an air outlet passage, having air and discharge means adapted to register with the air outlet passage of the crosshead during reciprocation thereof and to be closed during the exhaust period within the cylinder.

10. In an internal combustion engine, a cylinder having inlet and exhaust ports therein, a tubular extension formed with said cylinder, means for supplying air under pressure to said tubular extension, a hollow working piston moving in said cylinder, an extension carried by said piston and slidable within the tubular extension of the cylinder for controlling the flow of air into said cylinder and permitting the flow of air from said tubular extension of the cylinder to pass within the piston, and said extension carried by the piston adapted to wholly rest within the cylinder during the exhaust period of the latter whereby the air from the tubular extension may be admitted directly into the cylinder.

11. In an internal combustion engine, a cylinder having inlet and exhaust ports, a tubular extension formed with said cylinder and communicating therewith, means for supplying air under pressure to said tubular extension, a hollow working piston moving in said cylinder and adapted to control the exhaust port thereof, an extension carried by said hollow piston adapted to move into and out of the tubular extension of the cylinder for controlling the flow of air through said tubular extension, said extension carried by the piston having a passageway therein for admitting air from the tubular extension of the cylinder within the piston, said piston having passageways therein for establishing at times communication between the interior of said piston and said exhaust ports of the cylinder, and said piston adapted to control said exhaust ports whereby the flow of air through said piston and cylinder may be controlled.

In testimony whereof I affix my signature.

CECIL ISLE.